(12) United States Patent
Ghosh

(10) Patent No.: US 12,361,030 B2
(45) Date of Patent: *Jul. 15, 2025

(54) SYSTEMS AND METHODS FOR AUTOMATIC CHANGE REQUEST MANAGEMENT USING SIMILARITY METRIC COMPUTATIONS

(71) Applicant: FIDELITY INFORMATION SERVICES, LLC, Jacksonvile, FL (US)

(72) Inventor: Ranadhir Ghosh, Maharashtra (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,401

(22) Filed: Apr. 11, 2024

(65) Prior Publication Data
US 2024/0256574 A1    Aug. 1, 2024

Related U.S. Application Data

(63) Continuation of application No. 18/183,253, filed on Mar. 14, 2023, now Pat. No. 11,989,212, which is a
(Continued)

(30) Foreign Application Priority Data

Jan. 18, 2021    (IN) .............................. 202111002224

(51) Int. Cl.
*G06F 16/28*      (2019.01)
*G06F 16/23*      (2019.01)

(52) U.S. Cl.
CPC ........ *G06F 16/285* (2019.01); *G06F 16/2358* (2019.01)

(58) Field of Classification Search
CPC ...... G06F 16/285; G06F 16/2358; G06F 8/77; G06F 8/70; G06Q 10/06315; G06Q 10/06311
See application file for complete search history.

(56) References Cited

U.S. PATENT DOCUMENTS 7,565,348 B1    7/2009   Waldin
9,213,951 B2 *   12/2015   Ganjeh .................. G06Q 10/06
(Continued)

*Primary Examiner* — Huawen A Peng
(74) *Attorney, Agent, or Firm* — FINNEGAN, HENDERSON, FARABOW, GARRETT & DUNNER LLP

(57) ABSTRACT

Systems and methods for managing change requests are disclosed. A system for managing change requests may include a memory storing instructions and at least one processor configured to execute instructions to perform operations including: receiving, from a client device, a change request; routing the change request to a first similarity determination pipeline, based on the first classification, identifying an implementation device; and transmitting the change request to the implementation device. The first similarity determination pipeline may be configured to: extract at least one first request element from the change request; determine a first group of change requests based on the at least one first extracted request element; determine a first similarity metric between the change request and the first group of change requests; and determine a first classification of the change request based on the first similarity metric.

20 Claims, 10 Drawing Sheets

Related U.S. Application Data continuation of application No. 17/191,027, filed on Mar. 3, 2021, now Pat. No. 11,636,134.

(56) References Cited

U.S. PATENT DOCUMENTS

| | | | |
|---|---|---|---|
| 11,296,922 B2* | 4/2022 | Leibkowiz | G06F 16/2358 |
| 2014/0344195 A1 | 11/2014 | Drew | |
| 2016/0092557 A1 | 3/2016 | Stojanovic | |
| 2016/0253498 A1* | 9/2016 | Valencia | G06N 20/00 |
| | | | 726/23 |
| 2017/0124060 A1 | 5/2017 | Johnson | |
| 2018/0330015 A1 | 11/2018 | Ogren | |
| 2019/0311301 A1 | 10/2019 | Pyati | |
| 2020/0210955 A1 | 7/2020 | Bar-On | |
| 2020/0279020 A1 | 9/2020 | Bar-On | |
| 2020/0302364 A1 | 9/2020 | Singh | |
| 2021/0004442 A1 | 1/2021 | Sapugay | |
| 2021/0294681 A1* | 9/2021 | Jasionowski | G06N 20/00 |

* cited by examiner

| I | J | K | L | M | N | O |
|---|---|---|---|---|---|---|
| Reason for change | Exception change | Exception category | Exception owner | Outage required | Significant change | Location |
| Enhancement | TRUE | Outside Maintenance | Company A | FALSE | FALSE | NA/USA-AZ- |
| Enhancement | TRUE | Late Request | Company B | FALSE | FALSE | India/IND |
| Maintenance | TRUE | Late Request | Company C | FALSE | FALSE | NA/US-MN |
| Defect | TRUE | Late Request | Company D | FALSE | FALSE | Common/VJ |
| Compliance | TRUE | Late Request | Company E | FALSE | FALSE | Common/U |
| Enhancement | TRUE | Late Request | Company F | FALSE | FALSE | NA/US-NH |
| Defect | TRUE | Late Request | Company G | FALSE | FALSE | NA/USA-MA |
| Enhancement | TRUE | Outside Maintenance | Company H | FALSE | FALSE | EMEA/GBR- |
| Defect | TRUE | Late Request | Company I | FALSE | FALSE | Common/U |
| Enhancement | TRUE | Late Request | Company J | FALSE | FALSE | Common/U |
| Enhancement | TRUE | Late Request | Company K | FALSE | FALSE | NA/MOVE |
| Maintenance | TRUE | Late Request | Company L | FALSE | FALSE | Common/U |
| Maintenance | FALSE | | | FALSE | FALSE | NA/USA-AR |
| Enhancement | TRUE | Late Request | Company N | FALSE | FALSE | NA/USA-AR |

| P | Q | R | S | T |
|---|---|---|---|---|
| Short description | Description | State | Created | Planned start date |
| Storage NA Product | [What change are you making?] Racking the hardware | Closed | 2020-05-20 01:30:54 | 2020-05-21 15:00 |
| [CM][US][INFRA][ | [What change are you making?] Create RAC | Closed | 2020-05-20 15:09:01 | 2020-05-21 16:30 |
| [LSG-GTO], [US) | [What change are you making?] X drive on HOPMED | Closed | 2020-05-21 16:29:49 | 2020-05-21 18:00 |
| [Capital Markets] | [What change are you making?] Update BOKS | Open | 2020-05-20 05:04:48 | 2020-05-21 19:00 |
| grant root access | [What change are you making?] Requesting temporary | Closed | 2020-05-20 20:31:32 | 2020-05-21 20:30 |
| [Loanet), [NA), [Proc] | [What change are you making?] Moving Interactive | Closed | 2020-05-21 14:01:21 | 2020-05-21 22:00 |
| rotegent), [NA] | [What change are you making?] Fixing export SQL | Closed | 2020-05-21 15:28:17 | 2020-05-22 00:00 |
| Information Change | [What change are you making?] Create datastore | Closed | 2020-05-21 20:47:46 | 2020-05-22 02:00 |
| [digital one], [na] | [What change are you making?] Increase MaxMeta | Closed | 2020-05-21 16:11:15 | 2020-05-22 02:00 |
| Network, Bdoc | [What change are you making?] Configuring span/a | Closed | 2020-05-20 06:09:26 | 2020-05-22 02:00 |
| Exception - [LoB] | [What change are you making?] See attached Visic | Closed | 2020-05-21 21:07:24 | 2020-05-22 02:00 |
| [BDOC], [NA/USA] | [What change are you making?] Configure CHPIDS; | Open | 2020-05-20 14:58:17 | 2020-05-22 02:00 |
| [CISO], [NA], [PROD] | [What change are you making?] Transfer OLP disk | Closed | 2020-05-21 12:02:27 | 2020-05-22 02:00 |
| [LoB], [Region], [Env] | [What change are you making?] Adding McAfee | Closed | 2020-05-20 01:30:54 | 2020-05-21 15:00 |

| U | V | W | X | Y | Z | AA |
|---|---|---|---|---|---|---|
| Actual start | Planned end date | Actual end | Assignment group | Assigned to | Impact | Risk |
| 2020-05-21 16:35:00 | 2020-05-22 21:00:00 | | Storage Management | John Smith | 4-Low | Low |
| 2020-05-21 18:00:00 | 2020-05-23 09:30:00 | 2020-05-22 21:36:17 | Database Support- | Joe Cone | 4-Low | Low |
| | 2020-05-24 03:00:00 | 2020-05-22 01:00:00 | Backup Comms | Jim Smothers | 4-Low | Moderate |
| | 2020-05-25 21:00:00 | | DCC Program i | Bob Vice | 4-Low | Moderate |
| | 2020-05-22 17:04:54 | | DCC Program | Jane Doe | 4-Low | Low |
| 2020-05-22 20:30:00 | 2020-05-22 11:00:00 | 2020-05-23 11:00:00 | Network CS WANE | Jack Smith | 2-High | Low |
| 2020-05-21 22:00:00 | 2020-05-21 22:30:00 | 2020-05-21 22:30:00 | Potential Client | Ken Touche | 4-Low | Low |
| | 2020-05-22 10:00:00 | | Architecture CS | Robert Day | 3-Medium | Moderate |
| | 2020-05-22 03:00:00 | | Digital One Service | Bobby Night | 4-Low | Low |
| | 2020-05-22 06:00:00 | | Network Production | Sean Smith | 2-High | Low |
| | 2020-05-22 08:00:00 | 2020-05-22 06:17:00 | Network CS WANE | Paul Cord | 4-Low | Low |
| | 2020-05-22 08:00:00 | | Mainframe Storage | Kim Smith | 4-Low | Low |
| | 2020-05-22 03:00:00 | | Security Tools Force | Barnes Door | 1-Critical | High |
| 2020-05-22 03:27:00 | 2020-05-22 03:00:00 | | Security tools Oper | Sally Storm | 4-Low | Low |

FIG. 3D

| AB | AC | AD | AE | AF |
|---|---|---|---|---|
| Related CMS Change ticket | Change Management | LOB | Close code | Close notes |
|  |  | STOR | Successful | SVC Nodes |
|  |  | BCKUP | Successful | Implementation |
|  | Change Management | INV1 | Successful | The change was made |
|  | Change Management |  | TBD / Pending |  |
|  |  | Protegent | Successful | Implementation |
|  | Change Management |  | Successful | hopsspir5(config) |
|  | Change Management |  | Successful | none |
|  | Change Management | D1-Open | Successful | Datastores provided |
|  |  |  | Successful | ... |
|  |  |  | Successful | After working with |
|  | Change Management |  | Unsuccessful | Change was back |
|  | Change Management |  | TBD / Pending | Brought CHPIDs |
|  | Change Management | SSO | Successful | Applied change |
|  | Change Management | SSO | Successful | Successful |

FIG. 3E

| Str1 | Str2 | Lev | JW | Sorenssen |
|---|---|---|---|---|
| YZ Bank - NA Production Orbit Patching - 3 XYZ servers | YZ Bank - NA Production Orbit Patching - 2 XYZ servers | 0.97931 | 0.946672 | 0.923077 |
| [ABC], [CDF Extera] [USA], [Production], [ABCD], [Migrate the VM's from G1000 array to ALL FLASH G15K Storage Array in VOR-HDS-G1500 #22337_USA] | [ABC], [CDF Extera] [USA], [Production], [EFG], [Migrate the VM's from G1000 array to ALL FLASH G15K Storage Array in VOR-HDS-G1500 #22337_USA] | 0.972789 | 0.951353 | 0.947368 |
| Nowhere Co. [NON]-NA Production Orbit Patching - 2 XYZ servers | Nowhere Co. [NON]-NA Production Orbit Patching - 2 XYZ servers | 0.940397 | 0.929501 | 0.857143 |
| Nowhere Co. [NON]-NA Production Orbit Patching - 2 XYZ servers | Nowhere Co. [NON]-NA Production Orbit Patching - 9 XYZ servers | 0.938876 | 0.949936 | 0.740741 |
| SB, ULE(ULE DRE DC) Connectivity tests for new Extan Environment Release | SB, ULE(ULE PROD DC) Connectivity tests for new Extan Environment Release | 0.932432 | 0.93559 | 0.782609 |
| ASA061: Interface acl_production : Adding specific rules on top of liberal Rule no load run. | ASA061_Primary Firewall : Interface acl_production : Adding specific rules on top of liberal Rule as per Traffic flow analysis in ProgramA | 0.930233 | 0.888913 | 0.926829 |
| Brown Deer - Monthly Generator No Load Run - Perform monthly generator no load run | New Berlin - Monthly Generator No Load run - Perform monthly generator no load run | 0.927711 | 0.813404 | 0.866667 |
| Nowhere Co. [NON]-NA Production Orbit Patching - 2 XYZ servers | Nowhere Co. [NON]-NA Production Orbit Patching - 1 ABC server | 0.923077 | 0.942008 | 0.666667 |
| Nowhere Co. [NON]-NA Production Orbit Patching - 9 XYZ servers | Nowhere Co. [NON]-NA Production Orbit Patching - 1 ABC server | 0.917808 | 0.943584 | 0.714286 |
| ASA138: Interface-FBC-EID15279-COLO-DMA : Adding specific rules on top of liberal Rule as per Traffic flow analysis in ProgramA | ASA138: Interface-ABC-BANK-COLO-DMZ . Adding specific rules on top of liberal Rule as per Traffic flow analysis in ProgramA | 0.917647 | 0.897709 | 0.894737 |
| Nowhere Co. [NON]-NA Production Orbit Patching - 2 XYZ servers (SC) | Nowhere Co. [NON]-NA Production Orbit Patching - 9 ABC server | 0.909091 | 0.935641 | 0.827586 |
| [Remittance Processing], - NA - [UAT], [Orbit Patching] - 3 XYZ Servers | [Remittance Processing], - NA - [Production], [Orbit Patching] - 17 XYZ Servers | 0.907895 | 0.914891 | 0.818182 |
| [LOW], [LSG], [Server Storage], [PHY Server], [Rack/Stacking and turn-up new switch ports] | [LOW], [LSG], [Server Storage], [LMN], [Rack/Stacking and turn-up new switch ports] | 0.905028 | 0.905232 | 0.869565 |
| Nowhere Co. [NON]-NA Production Orbit Patching - 2 XYZ servers (SC) | Nowhere Co. [NON]-NA Production Orbit Patching - 19 ABC servers | 0.904459 | 0.796675 | 0.785714 |
| Nowhere Co. [NON]-NA Production Orbit Patching - 2 XYZ servers | Nowhere Co. [NON]-NA Production Orbit Patching - 19 ABC servers | 0.893333 | 0.806393 | 0.846154 |
| Nowhere Co. [NON]-NA Production Orbit Patching - 9 XYZ servers | Nowhere Co. [NON]-NA Production Orbit Patching - 19 ABC servers | 0.888889 | 0.791209 | 0.740741 |
| NA_LRTC, Production, Infrastructure - GIN Pre-Work for iGok | NA_LRTC, Production, Infrastructure - GIN Pre-Work for GBWC | 0.876033 | 0.86816 | 0.777778 |
| Smith and Jones - CI ENVIRONMENT - Adding routes to FW to advertise VIP IPs | BDOC and LTC - CI ENVIRONMENT - Adding routes to the FW to advertise VIP IPs | 0.875 | 0.801639 | 0.875 |
| BDOC and LTC - CI ENVIRONMENT - Adding routes to the FW to advertise VIP IPs | Smith and Jones - CI ENVIRONMENT - Adding routes to FW to advertise VIP IPs | 0.875 | 0.801639 | 0.875 |
| ASA061: Interface acl_production : Adding specific rules on top of liberal Rule as per Traffic flow analysis in ProgramA | ASA138: Interface-ABC-BANK-COLO-DMZ . Adding specific rules on top of liberal Rule as per Traffic flow analysis in Firemom | 0.870968 | 0.915736 | 0.820513 |

*FIG. 6*

SYSTEMS AND METHODS FOR AUTOMATIC CHANGE REQUEST MANAGEMENT USING SIMILARITY METRIC COMPUTATIONS

CROSS-REFERENCE TO RELATED APPLICATIONS

This application claims priority under 35 U.S.C. § 119 to Indian Patent Application No. 202111002224, filed on Jan. 18, 2021, the disclosure of which is expressly incorporated herein by reference in its entirety.

TECHNICAL FIELD

Exemplary embodiments generally relate to systems and methods for managing change requests. For example, disclosed techniques may include using one or more pipelines to determine similarity metrics between change requests. Some techniques may include performing additional actions based on a similarity metric, such as re-configuring a pipeline, re-configuring a system element, or transmitting change request data.

BACKGROUND

In some situations, such as developing software through patches, bug fixes, feature updates, capability additions, and other information technology changes, software developers frequently encounter change requests. In fact, tens of thousands of change requests may be received annually by a single software developer. The complexity of these change requests can vary. In some cases, the system re-configurations for implementing a change request may be numerous or resource-intensive, whereas other system re-configurations for implementing a change request may be relatively minor, in some cases being capable of automatic implementation by a machine. In many situations, similar change requests may lead to very similar implementations, which in many cases are not apparent to software developers. However, conventional techniques involve manual human review of change requests, regardless of similarity or level of complexity. In many cases, this can lead to errors, inefficient resource usage, and delay in implementation, which can hinder the deployment of changes to one or more systems. For example, these techniques may lead to individuals implementing change requests or portions of change requests that can be accomplished through automatic machine actions. As another example, these techniques may lead to individuals re-performed multiple actions for a change request which could have been eliminated by leveraging information from a similar change request.

In view of these deficiencies of change request analysis, there is a need for improved systems and methods for managing change requests, such as through the use of similarity metrics. The disclosed system and methods address one or more of the problems set forth above and/or other problems in the prior art.

SUMMARY

Consistent with the present embodiments, one aspect of the present disclosure is directed to a system for managing change requests. The system may comprise a non-transitory computer-readable medium containing a set of storing instructions and at least one processor configured to execute instructions to perform operations. These operations may comprise receiving, from a client device, a change request; routing the change request to a first similarity determination pipeline; based on the first classification, identifying an implementation device; and transmitting the change request to the implementation device. The first similarity determination pipeline may be configured to: extract at least one first request element from the change request; determine a first group of change requests based on the at least one first extracted request element; determine a first similarity metric between the change request and the first group of change requests; and determine a first classification of the change request based on the first similarity metric.

In an embodiment, the first similarity determination pipeline is configured to determine the first classification of the change request based on a degree of complexity associated with responding to the change request.

In an embodiment, a second similarity determination pipeline may be configured to: determine a second similarity metric between the change request and a second group of change requests; and determine a second classification of the change request based on the determined second similarity metric. The operations may further comprise: routing the change request to a second similarity determination pipeline; and determining, based on the first and second classifications, a meta-classification of the received change request. The transmitting may be based on the determined meta-classification.

In an embodiment, the operations may further comprise applying a first weight to the first similarity metric and applying a second weight to the second similarity metric; and the meta-classification of the received change request may be based on the weighted first similarity metric and weighted second similarity metric.

In an embodiment, the change request may comprise at least one optioned text field and one freeform text field.

In an embodiment, the at least one extracted first request element may comprise at least a portion of the freeform text field.

In an embodiment, the first similarity determination pipeline may be configured to determine the first similarity metric by comparing first characters between the freeform text field and second characters associated with at least one change request of the first group of change requests.

In an embodiment, the first classification may be based on the comparing yielding a threshold amount of first characters matching the second characters.

In an embodiment, the first similarity determination pipeline may be configured to determine the first similarity metric by computing at least one distance between a first numeric-space representation of first characters of the freeform text field and a second numeric-space representation of second characters of a reference change request.

In an embodiment, the at least one distance may be computed according to at least one of: a Levenshtein distance algorithm, a Jaro-Winkler distance algorithm, a Sorensen similarity distance algorithm, or a fuzzy distance algorithm.

In an embodiment, the first similarity determination pipeline may be configured to determine a cluster for the first numeric-space representation from among a plurality of clusters associated with a plurality of reference change requests.

In an embodiment, the at least one distance may be a Euclidean or a Hamming distance.

In an embodiment, the clusters may be associated with historical profiles, and the historical profiles may be associated with different respective success rates of change request responses.

In an embodiment, the first similarity metric may be determined based on the cluster for the first numeric-space representation.

In an embodiment, extracting the at least one first request element from the received change request may comprise applying at least one of a stop word removal, a case conversion, or a lemmatization to the received change request.

In an embodiment, the clusters may be determined using at least one of: a KNN clustering algorithm or a nearest centroid classifier algorithm; and extracting at least one first request element from the received change request may comprise applying a tf-idf feature extraction algorithm to the received change request.

In an embodiment, the first similarity determination pipeline may be further configured to generate the first numeric-space representation as an embedding, and the embedding may be based on the extracted at least one first request element.

In an embodiment, the clusters may be determined using a random forest model.

Yet another aspect of the present disclosure is directed to a method for managing change requests, which may comprise: receiving, from a client device, a change request; routing the change request to a first similarity determination pipeline; based on the first classification, determining an implementation device; and transmitting the change request to the implementation device. The first similarity determination pipeline may be configured to: extract at least one first request element from the change request; determine a first group of change requests based on the at least one first extracted request element; determine a first similarity metric between the received change request and the first group of change requests; and determine a first classification of the received change request based on the first similarity metric.

Yet another aspect of the present disclosure is directed to a system for managing change requests. The system may comprise a non-transitory computer-readable medium containing a set of storing instructions and at least one processor configured to execute instructions to perform operations. These operations may comprise: receiving, from a client device, a change request; routing the change request to a first similarity determination pipeline; routing the change request to a second similarity determination pipeline; determining, based on the first and second classifications, a meta-classification of the received change request; based on the meta-classification, determining an implementation device; and transmitting the change request to the implementation device, where the implementation device may be configured to at least reconfigure a system, reconfigure a device, alter a stored data element, or transmit a message to another processing device. The first similarity determination pipeline may be configured to: extract at least one first request element from the change request; determine a first group of change requests based on the at least one first extracted request element; determine a first similarity metric between the received change request and the first group of change requests; and determine a first classification of the received change request based on the first similarity metric. The second similarity determination pipeline may be configured to: determine a second similarity metric between the received change request and a second group of change requests; and determine a second classification of the received change request based on the determined second similarity metric.

Consistent with other disclosed embodiments, exemplary embodiments of non-transitory computer readable storage media may store program instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3B illustrates a second portion of a change request table, consistent with disclosed embodiments.

FIG. 3C illustrates a third portion of a change request table, consistent with disclosed embodiments.

FIG. 3D illustrates a fourth portion of a change request table, consistent with disclosed embodiments.

FIG. 3E illustrates a fifth portion of a change request table, consistent with disclosed embodiments.

FIG. 6 illustrates a change request similarity metric table, consistent with disclosed embodiments.

DETAILED DESCRIPTION

The disclosure is generally directed to systems and processes for coordinating the analysis, transmission, and management of change requests.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
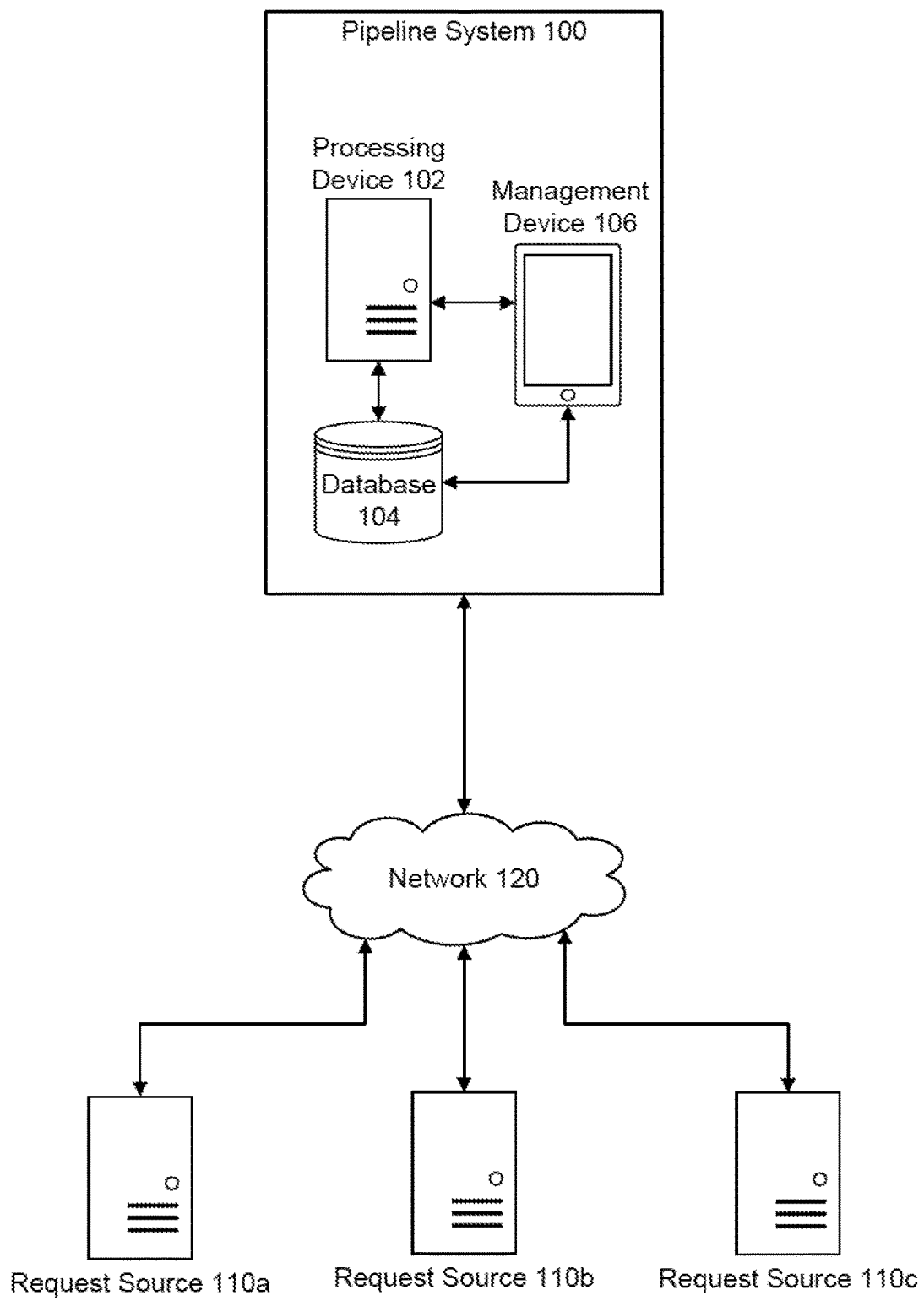
FIG. 1 illustrates an exemplary pictographic representation of a network architecture for managing change requests, consistent with disclosed embodiments.

FIG. 1 illustrates an exemplary pictographic representation of network architecture 10, which may include at least one computing device (e.g., processing device 102) configured to carry out processes discussed herein. In some embodiments, a computing device may be associated with a software developer, company, cybersecurity group, and/or other entity involved with managing change requests. In some embodiments, network architecture 10 may include pipeline system 100, which may be associated with handling change requests.

In some embodiments, network architecture 10 may include at least one pipeline system 100, which may be associated with implementing pipelines for handling change request data. In some embodiments, pipeline system 100 may include a processing device 102, which may be associated with implementing one or more software pipelines. A software pipeline (such as a similarity determination pipeline) may refer to any combination (e.g., a sequence) of a module, workflow, model, process, thread, routine, coroutine, function, or other processing element for parsing, manipulating, analyzing, transmitting, or otherwise handling change requests, such as by applying filters, computing distance metrics, computing similarity metrics, extracting data, and/or applying any other operation consistent with disclosed embodiments. In some embodiments, a software pipeline may include or may be based on a model (e.g., a trained model). In some embodiments, processing device 102 may be an instance of device 200 (discussed below).

In some embodiments, network architecture 10 may include at least one database 104, which may be configured to store change request data associated with one or more change requests, a data structure of change request data, and/or a data index, consistent with disclosed embodiments. Change request data may include a change request as received from another device (e.g., a request source 110), a source identifier of the change request (e.g., entity name, Internet Protocol address, etc.), one or more tasks associated with the change request, a responsible party identifier (e.g., a party responsible for implementing the change request), a device identifier (e.g., a device for re-configuring based on the change request), a system identifier (e.g., a system for re-configuring based on the change request), a timeline, a date, a time, a prior action performed to implement a change request, a data element shown in any of FIGS. 3A-3E and FIG. 6, and/or any other data element related to handling change requests, consistent with disclosed embodiments. Database 104 may include a cloud-based database (e.g., a database implementing a Relational Database Service (RDS)) or an on-premises database. Database 104 may also be a relational or non-relational database. Database 104 may alter change request data based on a received change request, a user input, an instruction from another device (e.g., processing device 102), a pipeline result, and/or other data, consistent with disclosed embodiments. For example, database 104 may generate information for a "date created" field when a change request is received, discussed below with respect to FIGS. 3A-3E. As another non-limiting example, database 104 may generate a priority value, impact score information, and/or a risk score based on a similarity metric calculated for a change request and/or user input. Database 104 may include data received from one or more components of network architecture 10 and/or computing components outside network architecture 10 (e.g., via network 120).

Network architecture 10 may also include management device 106, which may be associated with a user having configuration permissions for a device within network architecture 10. For example, management device 106 may be a computer, laptop, mobile device, server, or any device allowing a user to interact with another device in network architecture 10 (e.g., change a pipeline parameter at processing device 102, alter change request data at database 104, etc.). In some embodiments, management device 106 may grant access to another device (e.g., access to processing device 102) after receiving valid login credentials based on user input.

In some embodiments, network architecture 10 may include at least one request source 110, such as request sources 110a, 110b, and 110c. A request source may be a mobile device (e.g., a laptop), web server, content management server, mobile application host, non-web data host, database, cache, or any other device that may provide information (e.g., request data) to another device across a network (e.g., the Internet). For example, a request source may be part of a system associated with a first entity, which may be connected to another system managed by an entity that is associated with (e.g., controls) pipeline system 100. In some embodiments, a request source may be associated with a financial service provider, insurance provider, a physical merchant, an online merchant, a cybersecurity entity, or other group associated with a system that may submit a change request.

In some embodiments, network architecture 10 may include a network 120, which may communicably couple any of the aforementioned and subsequently mentioned devices. Network 120 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 120 may be connected to other networks (not depicted in FIG. 1) to connect the various system components to each other and/or to external systems or devices. In some embodiments, network 120 may be a secure network and require a password to access the network, or a portion of the network.

Figure 2:
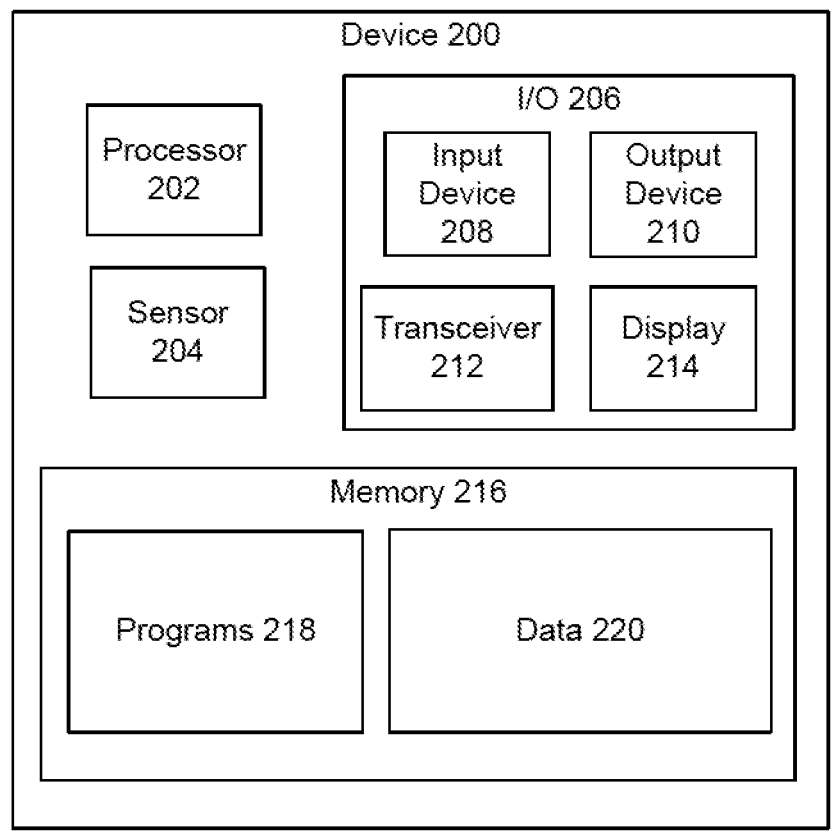
FIG. 2 illustrates an exemplary pictographic representation of a device for managing change requests, consistent with disclosed embodiments.

FIG. 2 illustrates an exemplary pictographic representation of device 200, which may carry out processes discussed herein. For example, device 200 may constitute one or more of processing device 102, database 104, management device 106, and/or request sources 110a, 110b, and/or 110c. Device 200 may include a processor 202, which may include one or more dedicated processing units, application-specific integrated circuits (ASICs), field-programmable gate arrays (FPGAs), graphical processing units, or various other types of processors or processing units coupled with memory 216. Processor 202 may constitute a single-core or multiple-core processor that executes parallel processes simultaneously. For example, processor 202 may be a single-core processor configured with virtual processing technologies. In some embodiments, processor 202 may use logical processors to simultaneously execute and control multiple processes. Processor 202 may implement virtual machine technologies, or other known technologies to provide the ability to execute, control, run, manipulate, store, etc., multiple software processes, applications, programs, etc. For example, a virtual computing instance (e.g., virtual machine, container, etc.) may be spun up or spun down (e.g., at a processing device 102) in response to processing demands (e.g., additional resources needed for distance computation, model training, clustering, etc.). In another embodiment, processor 202 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 202 may execute various instructions stored in memory 216 to perform various functions of the disclosed embodiments described in greater detail below. Processor 202 may be configured to execute functions written in one or more known programming languages.

In some embodiments, device 200 may include a sensor 204, such as an accelerometer, a light sensor, an audio sensor, an infrared sensor, a motion sensor, a piezoelectric sensor, a laser sensor, a sonar sensor, a Global Positioning System (GPS) sensor, an electromagnetic sensor, and the like. Sensor 204 may detect and/or collect data, which device 200 may store (e.g., at memory 216) and/or transmit to another device.

Device 200 may also include input/output devices (I/O) 206, which may include an input device 208, which may include, for example, at least one of a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, or the like. As will be appreciated by one of skill in the art, input device 208 may be any device capable of receiving inputs, including user inputs, to perform or assist in performing methods consistent with disclosed embodiments.

I/O 206 may also include an output device 210, which may include any device configured to provide user feedback, such as a visual display, a light-emitting diode (LED), a speaker, a haptic feedback device, or the like.

I/O 206 may include a transceiver 212, which may be configured to connect with at least one of any type of data network. For example, transceiver 212 may be at least one of a mobile network transceiver, Wi-Fi transceiver, a LiFi transceiver, Near Field Communication (NFC) transceiver, a radio transceiver, an ultra-high frequency (UHF) transceiver, a Bluetooth transceiver, an infrared transceiver, or other wireless transceiver.

I/O 206 may include a display 214, which may display data or other information associated with the processes described herein. For example, display 214 may include a liquid crystal display (LCD), in-plane switching liquid crystal display (IPS-LCD), an LED display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 214 may display graphical interfaces, interactable graphical elements, animations, dynamic graphical elements, and any other visual element.

Device 200 may also include memory 216, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 216 may include any number of hard disks, random access memories (RAMs), read-only memories (ROMs), erasable programmable read-only memories (EPROMs or Flash memories), and the like. Memory 216 may include one or more storage devices configured to store instructions usable by processor 202 to perform functions related to the disclosed embodiments. Memory 216 may also include any number of programs, applications, application program interfaces (APIs), or any other data, consistent with the disclosed embodiments.

In some embodiments, memory 216 may store programs 218, which may include one or more programs (e.g., APIs, processes, modules, code, scripts, functions, pipeline elements, etc.) used to perform methods consistent with disclosed embodiments. For example, memory 216 may include operation code (e.g., operating system code, application operation code, etc.) according to which an application may run on device 200. Programs 218 may be written in one or more programming or scripting languages. Memory 216 may also maintain data 220, which may include data associated with a user account, an application, a particular device, a model, a communication, or any other data related to analyzing item data. Data may be exchanged with a device 200 or between devices (e.g., processing device 102 and management device 106, processing device 102 and database 104, processing device 102 and request source 110c, etc.) in accordance with any number of formats or protocols, including extensible markup language (XML), Representational State Transfer (REST), Simple Object Access Protocol (SOAP), JavaScript Object Notation (JSON), GraphQL, and the like.

Memory 216 may also include a model (not shown), which may be an artificial intelligence (AI) model for analyzing item data, consistent with disclosed embodiments. A model may be, without limitation, any one of a computer software module, an algorithm, a machine-learning model, a data model, a statistical model, k-nearest neighbors (KNN) model, a nearest centroid classifier model, a random forest model, a text clustering model, a recurrent neural network (RNN) model, a long-short term memory (LSTM) model, a convolutional neural network model, or another neural network model, consistent with disclosed embodiments. In some embodiments, a model may be a model in a learning stage or may have been trained to a degree (e.g., by a developer, a machine, or a combination of both). In some embodiments, a developer may interact with a model to approve or disapprove of suggested changes to a model or parameters of a model (e.g., suggested by a machine). After such an interaction, the model may be updated to reflect the user interactions and/or machine inputs.

Figure 3A:
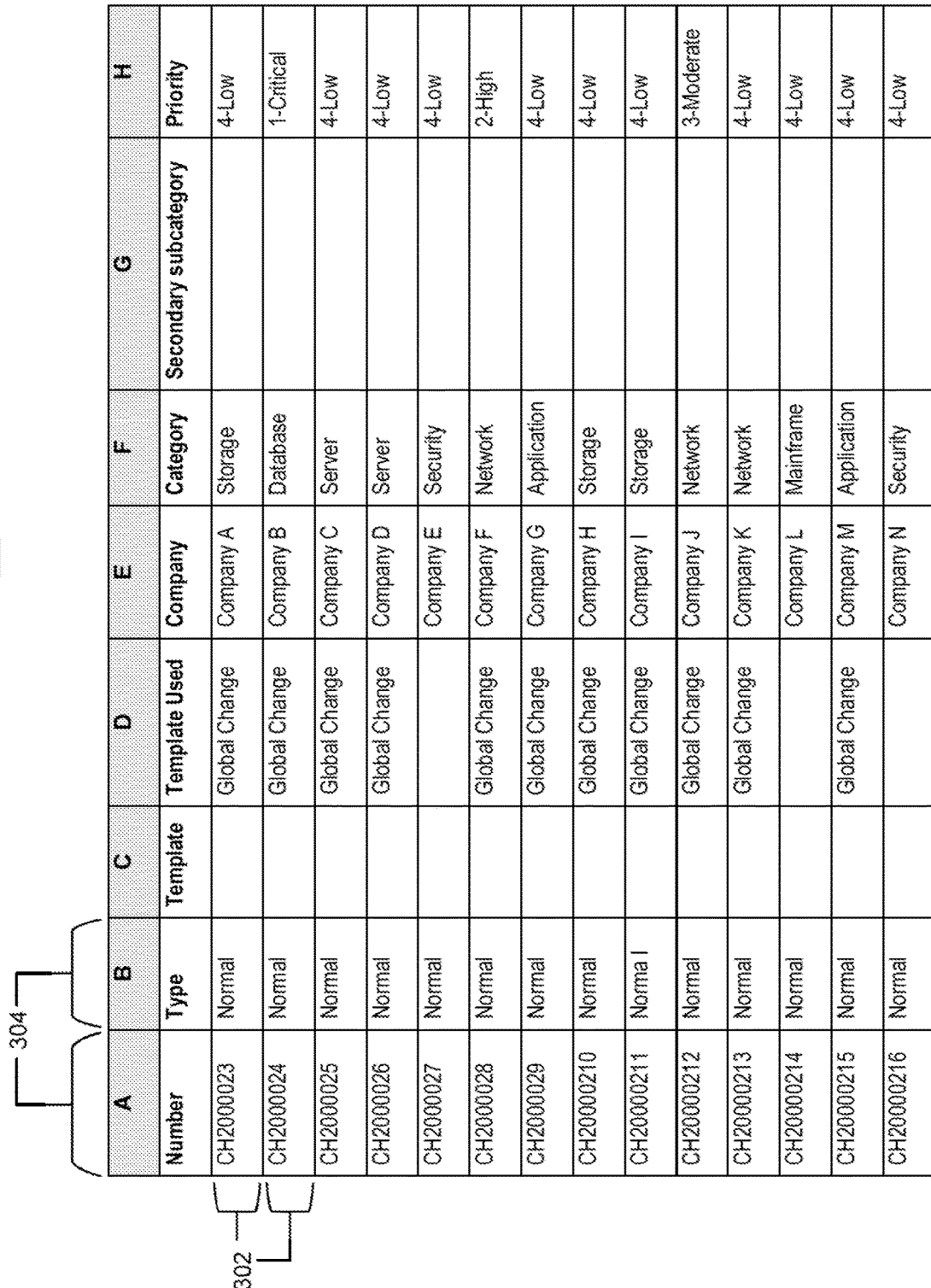
FIG. 3A illustrates a first portion of a change request table, consistent with disclosed embodiments.

FIG. 3A illustrates a first portion of a change request table 300, consistent with disclosed embodiments. FIGS. 3B, 3C, 3D, and 3E illustrate other portions of change request table 300. It is appreciated that change request table 300 may include any combination of all, some, or no information from each of FIGS. 3A, 3B, 3C, 3D, and 3E. In some embodiments, change request table 300 may be a data structure that includes one or more types of data elements associated with a change request. A data element associated with a change request may be, for example, a request number (e.g., a unique identifier for a request), type, template, used template, company identifier, entity identifier, category, priority indicator, a reason for a change request, an exception change value, an exception category, an exception owner, an outage criterion value, a significant change value, a location indicator, a description (e.g., a description of a nature of a change request), a long description (e.g., a description of details of a change request), a state indicator, a date created indicator, a planned start date indicator, an actual start date indicator, a planned end date indicator, an actual end date indicator, an assignment group, an assigned individual, an impact score, a risk score, a related change ticket number, a change management indicator, a line of business (LOB), a close code, and/or close notes. These various data elements are exemplary, as change request table 300 may include any data element related to a change request. In some embodiments, change request data elements may be arranged in an array of rows 302 and columns 304. For example, a row 302 within change request table 300 may be associated with a particular change request and a column 304 may be associated with a type of data element, as shown in FIGS. 3A, 3B, 3C, 3D, and 3E.

In some embodiments, a data element may be interface-entered (e.g., entered at an interface of a management device 106 and/or a request source 110) and/or machine-derived. For example, a company identifier may be entered into a freeform text field at a user interface of request source 110. As another example, a device (e.g., processing device 102) may derive a priority value, impact score information, and/or a risk score, which may be based on a similarity metric calculated for a change request and/or user input, and may add the derived information to change request table 300. In some embodiments, a data element may be optioned, such that a user may manipulate it (e.g., input data), but according to set of predefined options permitted for that data element (e.g., permitted by a data structure or device). For example, an optioned data element may only allow an input of either "true" or "false." In some embodiments, a change request or a portion of a change request may be generated by device running an application called Snow Software (developed by IBM).

Figure 4:
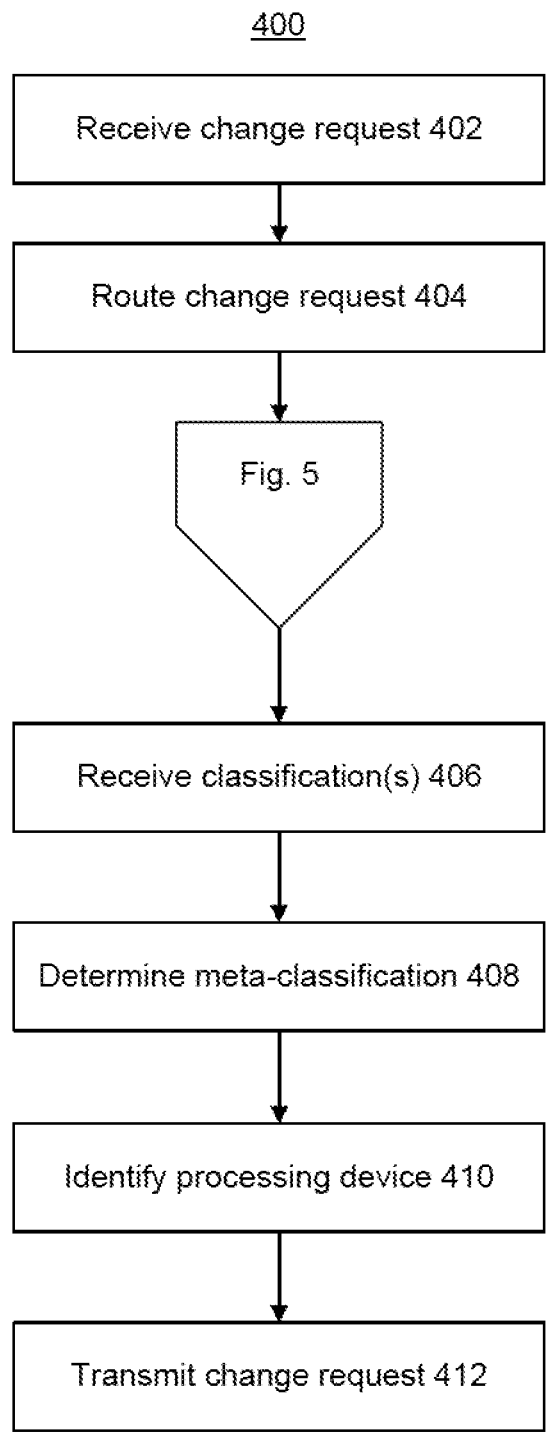
FIG. 4 depicts a flowchart of an exemplary process for managing change requests, consistent with disclosed embodiments.

FIG. 4 depicts a flowchart of an exemplary process 400 for managing change requests, which may be performed by a processor in accordance with disclosed embodiments. For example, process 400 may be performed entirely or in part by device 200 (e.g., using processor 202), such as a processing device 102 (or any other device within network architecture 10. Alternatively or additionally, some steps of process 400 may be performed by multiple devices 200, such as multiple processing devices 102. While process 400 is described with respect to processing device 102, one of skill will understand that the steps illustrated in FIG. 4 are exemplary and steps may be added, merged, divided, duplicated, repeated, modified, performed sequentially, performed in parallel, and/or deleted in some embodiments.

At step 402, processing device 102 may receive a change request, which may be received from a client device (e.g., a request source 110). In some embodiments, the change request may comprise at least one optioned text field (e.g., a text field allowing a limited number of characters, a text field permitting data entry according to set of predefined options, etc.) and one freeform text field (e.g., a text field with no character limit and/or entry restrictions).

At step 404, processing device 102 may route the change request. For example, processing device 102 may route the change request to a first similarity determination pipeline, which may be implemented by processing device 102 or another device (e.g., another processing device 102). In some embodiments, processing device 102 may route the change request to a second similarity determination pipeline, third similarity determination pipeline, or any number of similarity determination pipelines. For example, processing device 102 may simultaneously route the change request to a first similarity determination pipeline that implements a set of character-matching operations (among other possible operations), a second similarity pipeline that implements string distance calculations (among other possible operations), a third similarity pipeline that implements a KNN clustering algorithm (among other possible operations), and a fourth similarity pipeline that implements a random forest model (among other possible operations). In some embodiments, a pipeline may be busy, and processing device 102 may make available additional computing resources to perform the operations of the busy pipeline (e.g., routing to another pipeline, spinning up a virtual computing instance, as discussed above, etc.). In some embodiments, other operations may be performed (e.g., according to a similarity determination pipeline), prior to processing device 102 proceeding to other steps (e.g., step 406). For example, after step 404, a processing device performing process 400 may proceed to FIG. 5. In some embodiments, processing device 102 may implement a similarity determination pipeline for the change request without routing the change request.

At step 406, processing device 102 may receive at least one classification, which may be a classification of a change request. For example, processing device 102 may receive a first classification, a second classification, and/or any number of classifications. In some embodiments, a classification may be generated by a similarity determination pipeline (e.g., according to process 500). In some embodiments, a classification of a change request may be a classification of the change request as complex, template-based, standard, basic, simple, or any classification describing a degree of complexity associated with implementing the change request. A change request classification may be based on a similarity metric (e.g., as discussed with respect to process 500). A classification may comprise a similarity metric, a determination based on one or more similarity metrics, a confidence value, a risk score, an impact score, an action predicted for implementing the change request, and/or any information associated with fulfilling a change request.

At step 408, processing device 102 may determine a meta-classification, which may be based on one or more classifications (e.g., received at step 406). In some embodiments, processing device 102 may determine, based on first and second classifications, a meta-classification of the received change request. In some embodiments, processing device 102 may apply weights to multiple classifications to determine a meta-classification. For example, processing device 102 may apply a first weight to the first similarity metric and may apply a second weight to the second similarity metric. A meta-classification of a received change request may be based on the weighted first similarity metric and the weighted second similarity metric. For example, the meta-classification may be a summation of weighted similarity metrics. As another example, the meta-classification may be a same classification determined by a majority or plurality of pipelines that classified a change request. As yet another example, the meta-classification may be based on a combination of rules (e.g., if-then rules) applied to multiple classifications. As a non-limiting example, if a first and second pipeline produce a same classification, a third pipeline producing a different classification may be irrelevant and the meta-classification may follow the first and second pipelines.

At step 410, processing device 102 may identify an implementation device (e.g., another processing device 102, management device 106, etc.). In some embodiments, processing device 102 may identify another processing device based on a classification (e.g., a first classification) and/or a meta-classification. In some embodiments, the implementation device may be a device associated with an individual responsible for implementing a change for a change request (e.g., an assigned individual identified in a change request table 300). In some embodiments, the implementation device may be configured to perform at least one operation for implementing a change requested in a change request. For example, the implementation device may be configured to reconfigure a system, reconfigure a device, change computer code (e.g., to update or patch software, add functionality, etc.), re-allocate a computing resource, alter a stored data element, and/or transmit a message to another processing device. Thus, by quickly and accurately classifying a change request using similarity metrics, the change request may be fulfilled more rapidly, using fewer computing resources, and/or using less bandwidth (e.g., due to fewer inter-device communications between user devices and other system devices).

Figure 5:
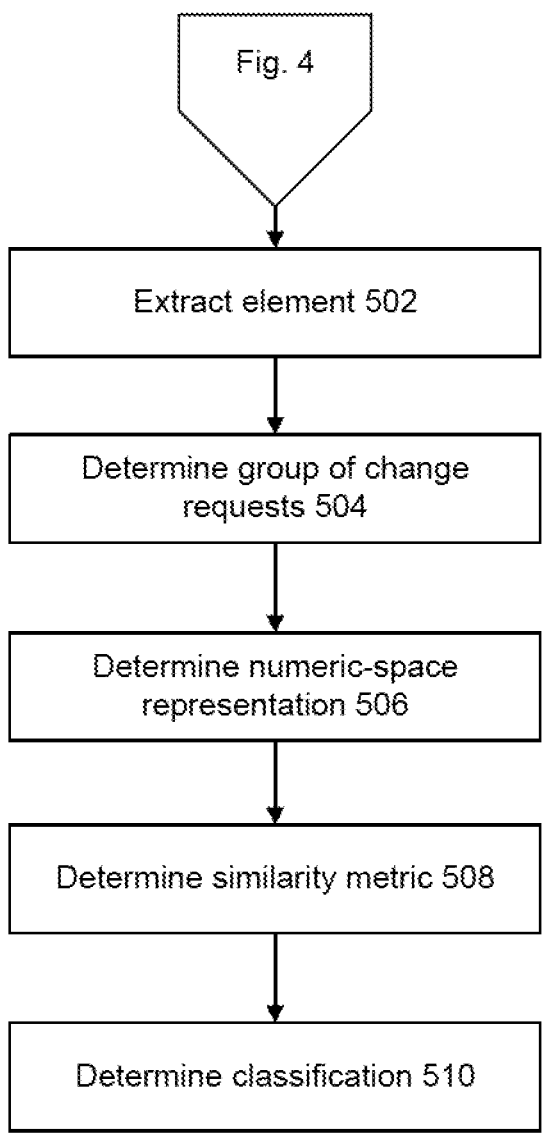
FIG. 5 depicts a flowchart of an exemplary process for determining change request similarity metrics, consistent with disclosed embodiments.

FIG. 5 depicts a flowchart of an exemplary process 500 for determining change request similarity metrics, which may be performed by a processor in accordance with disclosed embodiments. For example, process 500 may be performed entirely or in part by device 200 (e.g., using processor 202), such as a processing device 102 (or any other device within network architecture 10. Alternatively or additionally, some steps of process 500 may be performed by multiple devices 200, such as multiple processing devices 102. While process 500 is described with respect to processing device 102, one of skill will understand that the steps illustrated in FIG. 5 are exemplary and steps may be added, merged, divided, duplicated, repeated, modified, performed sequentially, performed in parallel, and/or deleted in some embodiments.

In some embodiments, a processing device 102 may train a model, which may be performed prior to the model being implemented as part of a pipeline (e.g., according to process 500). In some embodiments, a model may be a KNN clustering model, a nearest centroid classifier model, a random forest model, a text clustering model, and/or any model configured to determine similarity between text strings. Training may be supervised or unsupervised. For example, processing device 102 may train a model for generating distances (e.g., between strings) by generating an n-by-n matrix, where n may equal a number of strings or other data elements in a training dataset. In some embodiments, the elements within the matrix may include one or more values describing a distance between strings. In this manner, a row of the matrix may represent a characteristic representation of a string in the n dimension. Such a matrix may be iteratively altered or used as an input to a training model, to improve the accuracy of a distance computation algorithm (e.g., a Levenshtein distance algorithm, a Jaro-Winkler distance algorithm, a Sorensen similarity distance algorithm, and/or a fuzzy distance algorithm).

In some embodiments, artificial intelligence (AI) models may be applied to deterministic string measures (e.g., distances). Applying an AI model to a deterministic string measure may be performed to determine a number of clusters, a location of a cluster, and/or a boundary of a cluster. In some embodiments, processing device 102 may assign a unique identifier to each cluster. In some embodiments, some or all of the data elements (e.g., distances) in a reference or training dataset may be associated with one or more clusters.

In some embodiments, processing device 102 may construct a group profile for one or more clusters. For example, processing device 102 may determine a risk score, impact score, success rate (e.g., percentage of successful change request fulfillments), and/or close status associated with one or more change requests associated with a cluster. In some embodiments, processing device 102 may assign a categorization to a cluster based on its group profile. By way of a non-limiting example, processing device 102 may assign a categorization of "template-based" to a cluster having a group profile that includes a success rate of at least 90%.

It is appreciated that as additional numbers of change requests are classified (and potentially have their classifications confirmed by a user), such as according to process 500, their classifications may be used for additional model training, which may improve classification accuracy. Further discussion of distances, clusters, classifications, and other related aspects are discussed further below with respect to process 500.

At step 502, processing device 102 may extract an element from a change request. For example, processing device 102 may implement a similarity determination pipeline (e.g., a first similarity determination pipeline) that is configured to extract at least one first request element from a change request. In some embodiments, an extracted request element may comprise at least a portion of a freeform text field. For example, a similarity determination pipeline may be configured to extract a description from a change request, or any other change request data (such as change request data described with respect to change request table 300). In some embodiments, extracting a change request element from the received change request may comprise applying, to the received change request, a stop word removal, a case conversion, a lemmatization, a typo correction, and/or any filter that alters the representation of the extracted element (e.g., changing characters, punctuation, spaces, fonts, etc.). In some embodiments, extracting at least one request element from a received change request may comprise applying a tf-idf (term frequency-inverse document frequency) feature extraction algorithm to the received change request.

At step 504, processing device 102 may determine a group (e.g., a first group) of change requests, and the determination may be based on at least one extracted request element. By way of example, processing device 102 may determine that the extracted request element relates to partitioning a database, and may determine a group of change requests (e.g., fulfilled change requests) that also relate to partitioning a database (e.g., based on text extracted from change requests).

At step 506, processing device 102 may determine a numeric-space representation, which may be a numeric-space representation of a character (e.g., an American Standard Code for Information Interchange, or ASCII, character) or a group of characters (e.g., words, phrases, sentences, punctuations). A numeric-space representation may be a vector, matrix, coordinate value (e.g., for a multidimensional numeric space), and/or any expression that converts a character or group of characters into a representation capable of numerical comparison to another character or group of characters. In some embodiments, processing device 102 may determine a numeric-space representation for a first change request (e.g., at least one element extracted from a recently received change request). In some embodiments, processing device 102 may determine a numeric-space representation for a second change request (e.g., a stored numeric-space representation for an already classified change request). In some embodiments, a similarity determination pipeline may be configured to generate a numeric-space representation as an embedding, and the embedding may be based on at least one extracted request element. For example, processing device 102 may use a word2vec, GloVe ("Global Vectors"), FastText, or other similar text processing technique to generate an embedding.

At step 508, processing device 102 may determine a similarity metric. In some embodiments, processing device 102 may determine a first similarity metric between a change request and another change request, or between a change request and a first group of change requests. In some embodiments, processing device 102 may determine a second similarity metric between a change request and a second group of change requests.

In some embodiments, a similarity determination pipeline (e.g., implemented by processing device 102) may be configured to determine a similarity metric by comparing aspects (e.g., extracted elements) of a received change request to aspects of one or more other reference change requests (e.g., already classified change requests). In some embodiments, processing device 102 may accomplish this by using a deterministic similarity determination pipeline (e.g., a deterministic model). With this pipeline or any similarity determination pipeline, comparing first and second characters may comprise performing word-to-word matching, word-to-synonym matching, word ordering similarity identification, word combination similarity identification, or other operation to determine a degree to which the first and second characters (e.g., character groupings) are similar. For example, a similarity determination pipeline may compare first characters between the freeform text field and second characters associated with at least one change request of the first group of change requests. In some embodiments, such as prior to comparing first and second characters, processing device 102 may perform a standardization operation to the first and/or second characters, such as a stop word removal, a case conversion, a lemmatization, a typo correction, and/or a filter, as discussed above with respect to step 502.

In some embodiments, a similarity determination pipeline may determine a similarity score based on a result of comparing. In some embodiments, these comparisons may be associated with a first similarity determination pipeline. For example, a similarity score may be correlated with a raw number and/or percentage of any or all of: word-to-word matches, word-to-synonym matches, word ordering matches, word combination matches, and/or any other identified equivalency between portions of the first and second characters. In some embodiments, if a similarity determination pipeline determines a similarity score beyond a particular threshold, instructions to initiate another pipeline may be terminated. By way of example, if word-to-word matching between first and second characters yields a 99% match, a similarity determination pipeline may determine a classification for a change request associated with the first characters, and processing device 102 may use this classification in place of a meta-classification, and may determine not to route the change request to other similarity determination pipelines, which may be associated with more computational resource intensity. This may also cause more rapid classification for some change requests.

Alternatively or additionally, a similarity determination pipeline may be configured to determine a first similarity metric by computing at least one distance between a first numeric-space representation of first characters (e.g., first characters of freeform text field) and a second numeric-space representation of second characters (e.g., second characters of a reference change request). Thus, computing such a distance, as like the matching operations described above, may constitute a comparison between the first and second characters. In some embodiments, computing a distance may comprise performing operations of inserting, deleting, substituting, and/or transposing characters and/or groups of characters. In some embodiments, the distance may be a Euclidean or a Hamming distance. In some embodiments, processing device 102 may compute the distance according to at least one of: a Levenshtein distance algorithm, a Jaro-Winkler distance algorithm, a Sorensen similarity distance algorithm, and/or a fuzzy distance algorithm. In some embodiments, such distance metric computations may be associated with a second similarity determination pipeline.

In some embodiments, processing device 102 may implement a stochastic similarity determination pipeline (e.g., a stochastic model), which may use aspects of clustering and modeling. For example, additionally or alternatively, a similarity determination pipeline may be configured to determine a cluster for a first numeric-space representation (e.g., a numeric-space representation for a received change request), such as by determining the cluster from among a plurality of clusters associated with a plurality of reference change requests. In some embodiments, a processing device 102 (e.g., implementing a similarity determination pipeline) may compute a distance between a change request (e.g., an element extracted from a received change request) and a cluster. In some embodiments, clusters may be associated with historical profiles, which may be associated with different respective success rates of change request responses (e.g., rates of accurate classification, rates of successful change implementations, etc.). In some embodiments, a cluster may be determined (e.g., according to a similarity determination pipeline implemented by a processing device 102) using at least one of: a KNN clustering algorithm and/or a nearest centroid classifier algorithm. In some embodiments, a third similarity determination pipeline may be associated with using a KNN clustering algorithm and/or a nearest centroid classifier algorithm. Additionally or alternatively, a cluster may be determined using a random forest model (e.g., implemented by a processing device 102). In some embodiments, a fourth similarity determination pipeline may be associated with using a random forest model.

At step 510, processing device 102 may determine a classification, which may be a classification of a change request. In some embodiments, processing device 102 may determine a first classification of a change request based on a first similarity metric. In some embodiments, processing device 102 may determine a second classification of a change request based on a determined second similarity metric. In some embodiments, a classification may be based on whether a similarity score exceeds a threshold. For example, if a similarity score exceeds a threshold, a similarity determination pipeline may determine a particular classification for an associated change request. To further this example and without limitation, if a change request is determined to be similar to another change request or a group of change requests within an allowed margin, the change request may be classified based on a classification associated with the other change request(s) (e.g., a received change request may be given the same classification as other, already classified, change request(s)). Additionally or alternatively, a similarity metric may be determined based on a cluster for a numeric-space representation (e.g., the first numeric-space representation). For example, a processing device 102 may classify a change request based on a categorization of a cluster to which it is determined to be similar (e.g., falling within the cluster, being within a particular distance of the cluster, etc.). Thus, continuing the "template-based" categorization example, computing device 102 may classify a change request as "template-based" if it falls within, or within a particular distance of, the "template-based" categorized cluster.

In some embodiments, a similarity determination pipeline may be configured to determine a classification of the change request based on a degree of complexity associated with responding to the change request. For example, if operations to fulfill a change request include multiple steps of re-programming and software testing, it may be classified as complex. Without limitation, processing device 102 may also classify a change request as template-based, standard, basic, simple, or any classification describing a degree of complexity associated with implementing the change request. It is appreciated that a degree of complexity may be determined by determining a similarity between a received change request and another change request, cluster, etc.

FIG. 6 illustrates a first portion of a similarity metric table 600, consistent with disclosed embodiments. In some embodiments, similarity metric table 600 may include string information (e.g., characters) associated with one or more change requests and/or distances between strings (e.g., computed according to process 500). For example, similarity metric table 600 may be an intermediate data structure output within process 500. In some embodiments, similarity metric table 600 may include other values, such as a similarity metric, a weighted similarity metric, a classification, and/or a meta-classification. In some embodiments, a processing device 102 may output similarity metric table 600 to improve (e.g., train, with or without human input) a model and/or pipeline.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general-purpose computer, special-purpose computer, or other programmable data processing apparatus, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A method for managing change requests, comprising:
receiving a change request;
extracting a first request element from the change request;
determining a first group of change requests based on the extracted first request element;
determining a first similarity metric between the received change request and the first group of change requests;
determining a first classification of the received change request based on the first similarity metric;
determining an implementation device to implement the received change request based on the first classification; and
transmitting the received change request to the implementation device.

2. The method of claim 1, wherein the change request includes at least one optioned text field and one freeform text field.

3. The method of claim 1, wherein extracting the first request element comprises applying at least one of a stop word removal, a case conversion, a lemmatization, or a typographical correction to the received change request.

4. The method of claim 1, wherein extracting the first request element comprises applying a term frequency-inverse document frequency feature extraction algorithm to the received change request.

5. The method of claim 1, further comprising:
determining a second similarity metric between the received change request and a second group of change requests; and
determining a second classification of the received change request based on the determined second similarity metric.

6. The method of claim 5, further comprising:
determining a meta-classification of the received change request based on the first classification and the second classification; and
the transmitting is based on the determined meta-classification.

7. The method of claim 6, further comprising:
applying a first weight to the first similarity metric; and
applying a second weight to the second similarity metric, wherein the meta-classification of the received change request is based on the weighted first similarity metric and the weighted second similarity metric.

8. The method of claim 1, wherein determining the first similarity metric comprises comparing the extracted first request element with at least one change request of the first group of change requests.

9. The method of claim 8, wherein the comparing includes performing at least one of: word-to-word matching, word-to-synonym matching, word ordering similarity identification, or word combination similarity identification.

10. The method of claim 8, wherein the comparing includes determining a similarity score based on a result of the comparing.

11. The method of claim 10, wherein the similarity score is based on a count or a percentage of at least one of: word-to-word matches, word-to-synonym matches, word ordering matches, or word combination matches.

12. The method of claim 10, wherein the first classification is based on whether the similarity score exceeds a threshold.

13. The method of claim 1, wherein determining the first similarity metric comprises computing at least one distance between a first numeric-space representation of first characters of the extracted first request element and a second numeric-space representation of second characters of a reference change request element.

14. The method of claim 13, wherein computing the at least one distance includes at least one of: inserting, deleting, substituting, or transposing characters or groups of characters.

15. The method of claim 13, wherein computing the at least one distance includes computing a Euclidean or a Hamming distance.

16. The method of claim 13, wherein the at least one distance is computer according to at least one of: a Levenshtein distance algorithm, a Jaro-Winkler distance algorithm, a Sorensen similarity distance algorithm, or a fuzzy distance algorithm.

17. A system for managing change requests, comprising:
at least one processor; and
a non-transitory computer-readable medium containing a set of instructions that, when executed by the at least one processor, cause the at least one processor to perform operations comprising:

receiving a change request;

extracting a first request element from the change request;

determining a first group of change requests based on the extracted first request element;

determining a first similarity metric between the received change request and the first group of change requests;

determining a first classification of the received change request based on the first similarity metric;

determining an implementation device to implement the received change request based on the first classification; and transmitting the received change request to the implementation device.

18. The system of claim 17, wherein the operations further comprise:

determining a second similarity metric between the received change request and a second group of change requests; and determining a second classification of the received change request based on the determined second similarity metric.

19. The method of claim 18, wherein the operations further comprise:

determining a meta-classification of the received change request based on the first classification and the second classification; and the transmitting is based on the determined meta-classification.

20. The method of claim 19, wherein the operations further comprise:

applying a first weight to the first similarity metric; and applying a second weight to the second similarity metric, wherein the meta-classification of the received change request is based on the weighted first similarity metric and the weighted second similarity metric.

* * * * *